United States Patent [19]

Keller

[11] 4,278,352

[45] Jul. 14, 1981

[54] SUPPORT SYSTEM FOR EXTENSIBLE BELLOWS

[75] Inventor: Bruce E. Keller, Federal Way, Wash.

[73] Assignee: The Boeing Company, Seattle, Wash.

[21] Appl. No.: 88,204

[22] Filed: Oct. 24, 1979

[51] Int. Cl.³ .............................................. G01B 9/02
[52] U.S. Cl. .................................... 356/358; 350/60; 350/70; 350/250
[58] Field of Search ................... 356/358; 350/60, 61, 350/70, 250; 354/187, 191

[56] References Cited

U.S. PATENT DOCUMENTS

| 2,522,280 | 9/1950 | Koilmorgen | 350/70 X |
| 2,846,919 | 8/1958 | Thomson | 356/358 X |
| 2,886,066 | 5/1959 | Hausen | 354/187 X |

Primary Examiner—Corbin, John K.
Assistant Examiner—Matthew W. Koren
Attorney, Agent, or Firm—Thomas H. Murray

[57] ABSTRACT

A horizontally-extending bellows for enclosing a light beam in optical interferometer apparatus and the like, which incorporates means for maintaining the bellows straight as it is extended along a horizontal path, whereby the bellows is maintained in alignment with the light beam for all lengths of the bellows.

9 Claims, 4 Drawing Figures

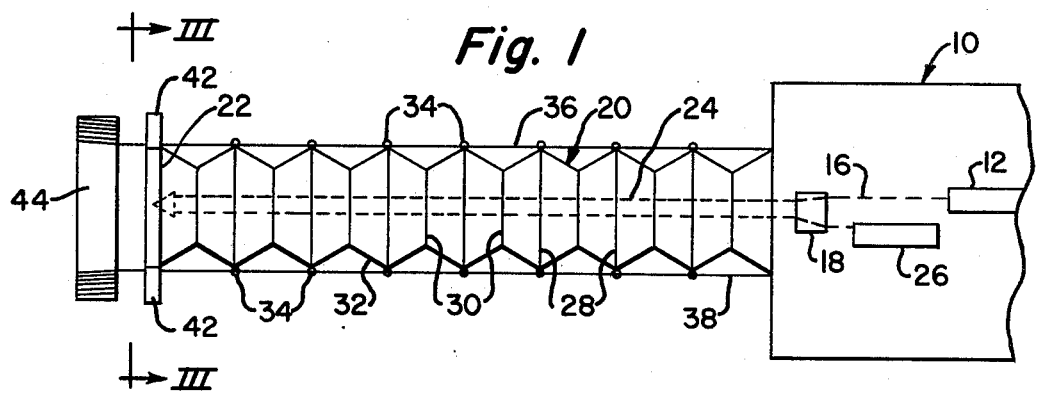
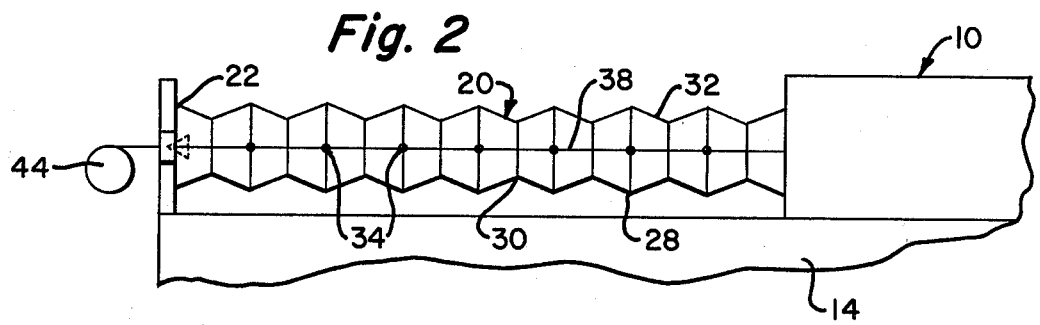
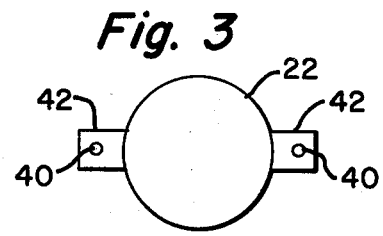
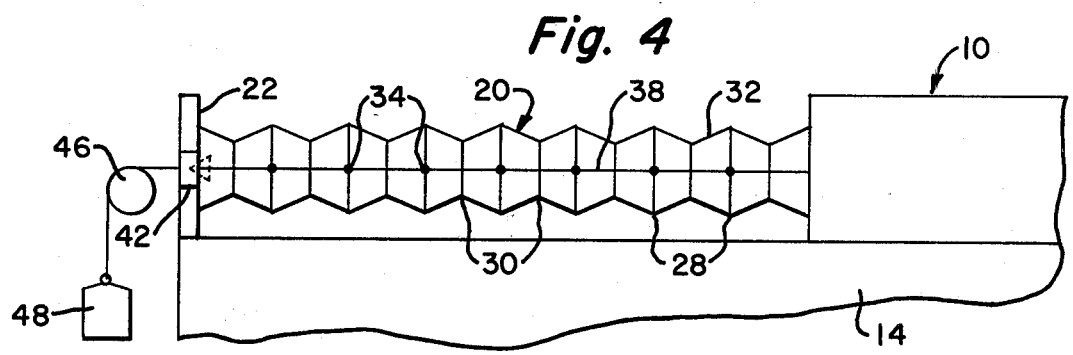

SUPPORT SYSTEM FOR EXTENSIBLE BELLOWS

BACKGROUND OF THE INVENTION

While not limited thereto, the present invention is particularly adapted for use with optical laser interferometer apparatus wherein a light beam from a laser passes through a beam splitter, with a portion of the beam passing to a retroreflector mounted on a member movable with respect to the beam splitter. The reflected beam is then applied to an interferometer which will produce, through interference phenomena or the Doppler effect, a number of output pulses proportional to the travel of the member on which the retroreflector is mounted with respect to a fixed point. Such devices have utility, for example, in machine tools where the travel of one or more workpiece support tables must be measured.

In applications of this sort, it is essential to completely enclose the retroreflector and laser beam for all measurements of the member on which the movable retroreflector is mounted. In this respect, it is essential to reduce or eliminate contamination of the laser optics and/or environmental effects on the laser light. Oil-mist, dust, moisture and other materials present in the atmosphere have a tendency to collect on exposed optical surfaces, thus reducing the effective reflected or transmitted laser light energy. In addition, air temperature gradients, which cause the laser beam to move spatially about its line of sight, tend to reduce the effectiveness and reliability of the laser measuring device. The solution is to enclose the optics in an enclosure and to enclose the laser light beam in a flight tube.

A flight tube of this type must be sufficiently rigid to maintain a straight-line orientation when mounted in a horizontal attitude. In the past, rigid tubing has been employed as a support mechanism with one end (usually the end closest to the laser optics) held rigid. The other end is permitted to slide through a hole in the retroreflector support bracket. The problem with this technique, however, is that when the flight tube length is a minimum, the excess support tubing length extends beyond the end of a machine or the like on which it is used, thus causing a hazardous condition and wasted space. Also, rigid support tubes have a tendency to droop downwardly or bend when the flight tube is at a maximum length, thus interfering with the laser beam itself.

Theoretically, the problems encountered with rigid flight tubes comprising one rigid tube which slides within another can be obviated by means of a flexible bellows. The ordinary flexible bellows, however, will sag and cannot be maintained straight when it is extended.

SUMMARY OF THE INVENTION

In accordance with the present invention, a laser flight tube is provided comprising a flexible bellows together with means for maintaining the bellows rigid along a straight-line path of travel for all lengths of the bellows.

Specifically, there is provided a horizontally-extending tubular means for enclosing a light beam or the like comprising a generally cylindrical extensible and collapsible bellows having alternate large and small diameter rigid circular elements interconnected by flexible material such that the circular elements can move toward or away from each other to either extend or collapse the bellows. Grommet means are attached to at least some of the circular elements and are aligned along straight-line paths of travel. These grommet means receive cables which extend through the grommet means on either side of the bellows. One end of the cable means is secured to a fixed member, while means are provided at the other end of the cable means for tensioning the same, thereby maintaining the bellows in a straight-line orientation.

In the preferred embodiment of the invention, two diametrically-opposite sets of grommets are secured to the large-diameter circular elements of the bellows. The cable means are preferably tensioned by either a spring-loaded take-up spool at one end of the bellows or by means of weights secured to one end of the cable on either side of the bellows.

The above and other objects and features of the invention will become apparent from the following detailed description taken in connection with the accompanying drawings which form a part of this specification, and in which:

FIG. 1 is a top view of one embodiment of the invention;

FIG. 2 is a side view of the embodiment of the invention shown in FIG. 1;

FIG. 3 is an end view taken substantially along line III—III of FIG. 1; and

FIG. 4 is a side view of an alternative embodiment of the invention which employs weights for the purpose of tensioning the cable means of the invention.

With reference now to the drawings, and particularly to FIGS. 1 and 2, there is shown an enclosure 10 for a laser 12, the enclosure 10 being mounted on a stationary support 14 shown in FIG. 2. The laser 12 produces a light beam 16 which passes through a beam splitter 18 and thence through a bellows enclosure 20 which carries at its other end a retroreflector 22. A portion of the light beam 16 passes through the beam splitter 18 and then passes along path 24 to the retroreflector 22 where it is reflected back to the beam splitter and thence to an optical interferometer 26 within the enclosure 10. The interferometer 26, which operates on interference phenomena or on the Doppler effect, is adapted to produce a number of electrical output pulses as the retroreflector 22 moves toward or away from the housing 10, these pulses being proportional in number to the distance between the enclosure and the retroreflector.

As was mentioned above, it is essential to protect the laser optics from environmental effects; and it is for this reason that the beam 16 is enclosed by the bellows 20. A bellows of this type, however, has a tendency to sag when disposed along a horizontal path of travel; and, for this reason, such a bellows is ordinarily not satisfactory for a laser flight tube.

As shown in FIGS. 1 and 2, the bellows 20 comprises large-diameter circular wire elements 28 and small-diameter wire elements 30 interconnected by flexible material 32. In this manner, the wire elements 28 and 30 can move toward or away from each other, thereby extending or collapsing the bellows.

In order to prevent sagging of the bellows along a horizontal path, and in accordance with the present invention, grommets 34 are provided on diametrically-opposite sides of each of the large-diameter wire elements 28. Passing through the grommets 34 are two cables or wires 36 and 38. These are secured at one end to the stationary housing 10 and pass through openings 40 (FIG. 3) provided on diametrically-opposite lugs 42 carried on the retroreflector 22. The end of the cables 36 and 38 opposite the stationary enclosure 10 are wound around a spring-loaded take-up spool 44 which can be on the movable retroreflector 22 or an auxiliary support, not shown. It will be appreciated that as the retroreflector 22 moves toward or away from the housing 10, the spring-loaded spool 44 will always maintain the cables 36 and 38 in a taut condition, thereby preventing sagging of the bellows 20.

In FIG. 4, an alternative embodiment of the invention is shown which is similar to that of FIGS. 1–3. Accordingly, elements in FIG. 4 which correspond to those of FIGS. 1–3 are identified by like reference numerals. In this case, however, the cables 36 and 38 pass through openings 40 in the lugs 42 on retroreflector 22 and pass around pulleys 46 where they are connected to weights 48. As will be appreciated, the weights 48 will maintain the cables 36 and 38 taut regardless of the position of retroreflector 22 with respect to housing 10, thereby maintaining the bellows 20 straight regardless of the length of the bellows.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A horizontally-extending tubular means for enclosing a light beam or the like comprising a generally cylindrical extensible and collapsible bellows having alternate large and small diameter rigid circular elements interconnected by flexible material such that the circular elements can move toward or away from each other, grommet means attached to at least some of said circular elements and aligned along straight-line paths of travel, cable means extending through said grommet means, and means for tensioning said cable means to prevent sagging of the bellows when extended in a horizontal direction.

2. The combination of claim 1 wherein said grommet means are diametrically opposite each other.

3. The combination of claim 1 wherein said grommet means are attached to said large-diameter circular elements.

4. The combination of claim 1 wherein said tensioning means comprises a take-up spool about which said cable means are wound at one end of said bellows.

5. The combination of claim 4 wherein the ends of said cable means opposite said take-up spool are secured to a fixed member.

6. The combination of claim 5 wherein said take-up spool is spring-loaded to rotate the spool and take up any slack in the cable means.

7. The combination of claim 1 wherein said tensioning means comprises a weight connected to one end of each cable means such that gravity will maintain the cable means taut, the other end of each cable means opposite said weight being secured to a fixed member.

8. The combination of claim 1 wherein said bellows carries a retroreflector at one end thereof, and optical distance measuring apparatus at the other end of the bellows, said measuring apparatus including means for directing a beam of light onto said retroreflector.

9. The combination of claim 8 wherein said optical distance measuring apparatus includes a laser for producing said light beam, and optical interferometer means responsive to light reflected from said retroreflector.

* * * * *